Jan. 31, 1956  R. RUHNAU ET AL  2,732,756
ARRANGEMENT FOR THE SUPPORT OF THE FILM GUIDING
COMPONENTS OF A CINEMA PROJECTOR
Filed Nov. 15, 1952
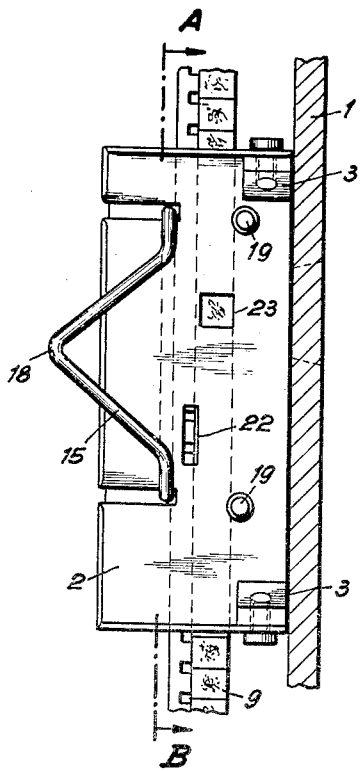
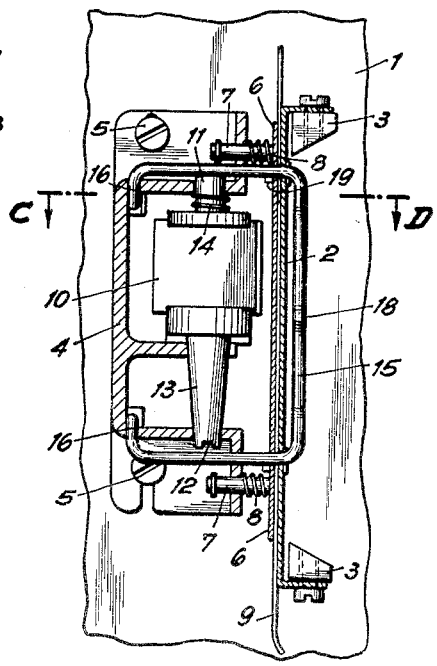
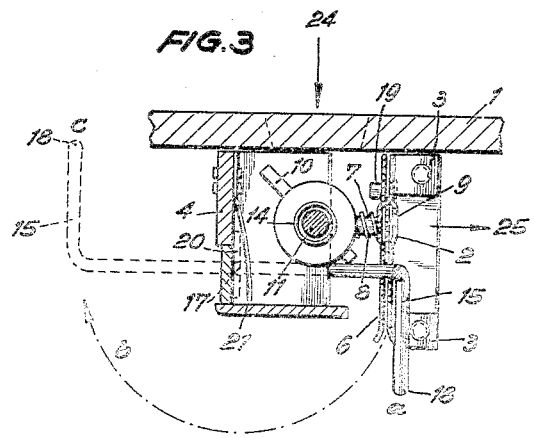
INVENTORS
RICHARD RUHNAU
ERICH WEIDES
GUNTER ENGELAGE
ATTORNEY

United States Patent Office 2,732,756
Patented Jan. 31, 1956

2,732,756

ARRANGEMENT FOR THE SUPPORT OF THE FILM GUIDING COMPONENTS OF A CINEMA PROJECTOR

Richard Ruhman, Berlin-Tempelhof, and Erich Weides and Günter Engelage, Langel, near Koln, Germany Application November 15, 1952, Serial No. 320,788

Claims priority, application Germany December 8, 1951

5 Claims. (Cl. 88—17)

The invention relates to an arrangement for the support of the film guiding components of a cinema projector, particularly for narrow gauge film.

In the known cinema projectors the film strip rolls off the storage reel and, driven by a system of gripping means and controlled as regards its speed, slides on to a receiver reel through a film channel which is formed by a fixed frame gate and a counter-gate resiliently contacting the same. The film frames are projected on to the cinema screen through frame windows arranged in the frame gate and in the countergate.

With cinema projectors for small side frames such as narrow gauge film cinema projectors, the designer has the problem of arranging the film guiding components within the narrowest possible space using a minimum amount of material.

This is attained according to the invention by providing a cinema projector wall, on which the frame gate is attached by means of two brackets, and a mirror holder upon which the countergate, a mirror and a film guide loop are mounted.

This kind of arrangement has the further advantage that the frame gate on the one hand, and the mirror holder with countergate, mirror and film guide loop on the other hand, can each be completely assembled and adjusted as a self-contained structural group.

The mirror holder serves some particular purposes, the countergate is resiliently supported thereon in a direction perpendicular to the film, by means of two bolts attached at its ends. The resilience is attained conveniently in such a manner that the bolts are surrounded by two compression springs which abut at one end against the mirror holder, and at the other end bear slightly against the countergate. Thus the film always lies flatly against the fixed frame gate so that a sharp image on the cinema screen is assured.

Moreover, according to the invention a plane mirror is rotatably and shiftably supported on the mirror holder against a compression spring. The object of the plane mirror is to rotate the path of the light emitted by the projector lamp and focused by a concave mirror through a right angle so that the beam of light may travel through the frame window in the countergate, through the film, through the frame window in the frame gate and thence through the optical system of the projector to the cinema screen. By rotating the plane mirror the light rays incident upon it can be adjusted accurately so as to travel along the optical axis of the optical projector system.

It is possible to mount the plane mirror movably against a compression spring, and this enables the mirror to be supported inside the mirror holder.

Finally, according to the invention a rotatable film guide loop is pivoted on the mirror holder.

This loop is, according to the invention of rectangular shape which is left open on one long side except for short end pieces and which on the other long side has a bent portion projecting approximately at a right angle to the plane of the rectangle. The bent projection is easy to grip and thus allows the film guide loop to be rotated quickly and safely.

The film guide loop must be fixed securely in certain positions.

This is attained according to the invention in that the loop is provided with projections mounted at its ends and at right angles to its plane, and is held, by means of leaf springs attached to the mirror holder and in contact with at least one of the projections thus keeping the loop in a predetermined position.

The projections ensure a stable support of the loop in its two extreme positions. The loop is rotated away from the countergate in order to allow the insertion of the film into the film channel, when moved back into position it engages on the film insertion side into slot-shaped recesses in the frame gate and in the countergate, and so ensures that the film remains in the film channel.

A safe support of the film guide loop in any position of the loop is made possible since according to the invention its cross section is circular, while its ends, which come in contact with the leaf springs, are provided with flats which can be adjusted parallel to the leaf springs.

Accordingly the mirror holder supports an adjustable mirror which holds the gate in position and also supports a rotatable film guide loop which prevents the film in spite of its quick jerky movements from leaving the film channel on the side of insertion. The film is held in position on the edge facing the main partition wall by two film guide bolts adjustably arranged on the frame gate.

The frame gate and the counter gate are provided according to the invention with a frame window, a gripper window, two slots for the film guide loop, and a longitudinal recess within the range of the film frames.

The frame windows allow the passage of light, while the gripper windows allow the gripper tooth movement to feed the film through the gate. The two slots in the frame gate and in the countergate allow the film guide loop to be moved inwards so as to hold the film in position on the insertion side. The longitudinal recesses in the frame gate and in the counter gate are within the range of the film frames and serve for their preservation, since in this range the film tape runs freely, on the emulsion side as well as on the rear side.

It has been found particularly advantageous to manufacture the device according to the invention using an injection moulding process.

For example, the cinema projector wall, which forms the main partition, the two lugs, the mirror holder with its apertures for accommodating the countergate the mirror and the film guide loop may each be made in the form of an injection moulder casting.

In the drawing an embodiment of the arrangement according to the invention is shown by way of example.

Figure 1 shows a side elevation,
Figure 2 a section along A—B in Figure 1 and
Figure 3 a section along C—D in Figure 2.

The frame gate 2 is screwed by the aid of the lugs 3 to the main partition wall 1, which is a vertical intermediate wall of the cinema projector. The main partition wall and lugs consist of a single injection moulded casting. The mirror holder 4, which is also an injection moulded casting, is screwed on to the main partition wall 1 by means of the screws 5. The countergate 6 is movably supported on the mirror holder 4 by means of the bolts 7. The film 9 is gently but firmly held between the countergate 6 and the frame gate 2 by compression springs 8.

The plane mirror 10 is supported rotatably on the mirror holder 4 and is longitudinally shiftable by means of the cylindrical pivot pin 11 and the conical pivot pin 13 which has a slot 12 for a screw driver. Also mounted on the mirror holder 4 is a film guide loop 15 which is rectangular in shape, open on one long side except for short end pieces 16. These ends form an axis 17 about which the loop may be rotated. The other long side of the loop extends perpendicularly to its plane to form the V-shaped portion 18 which facilitates manual rotation from the position $a$ via the path $b$ into the position $c$ (Figure 3). In the position $a$ of the film guide loop 15 the film 9 is confined between the loop at its front edge and two film guide bolts 19 attached on the frame gate 2 at its rear edge. The loop 15 is held securely in the positions $a$ and $c$ by means of projections 20 mounted perpendicularly to the plane of the loop and by means of the leaf springs 21 which in turn hold the projections in position. The end of the loop may be provided with flats (not shown in the drawing) instead of the projections, which flats lie at right angles to the plane of the loop and which ensure the retention of the film guide loop 15 in the positions $a$ and $c$.

The gripper of the gripper system extends through the gripper window 22 of the frame gate to engage the perforations in the film and thus control the film motion. The light passes through the frame windows 23 of the countergate and the frame gate. Light enters at 24 and passes through a glass heat filter in the main partition wall 1. The light is deflected through 90° at the plane mirror 10 and having passed through the film and the frame windows 23, emerges at 25.

We claim:

1. In a cinema projector, in which light is reflected from a source of light into the axis of projection, a frame, a fixed frame gate mounted on said frame, a unitary assembly comprising a bracket support, means for mounting said bracket support on said frame, a spring pressed countergate attached to said bracket support to resiliently engage said fixed frame gate, a deflecting mirror, pivotable means on said bracket support comprising two holding members clamping said mirror therebetween, mounting it perpendicularly to the plane containing said axis of projection and said source of light and permitting angular adjustments of said mirror for focussing light rays from said source of light to said frame gates, and a film guiding loop hingedly mounted on said bracket support and, in its normal, operative position, sideways gripping over said frame gates to edgewise engage one side of a film inserted between said frame gates and being adapted to be swung to a second, inoperative position away from said frame gates and said film.

2. In a cinema projector according to claim 1, spring means between said bracket support and one of said holding members resiliently pressing said mirror against said other holding member.

3. In a cinema projector according to claim 1, in which said loop comprises a generally U-shaped member, trunnion ends on said member enabling hinging thereof on said bracket support, and a projecting handle portion disposed centrally of said U-shaped member.

4. In a cinema projector according to claim 1, in which said loop comprises a generally U-shaped member, trunnion ends on said member enabling hinging thereof on said bracket support, a projecting handle portion disposed centrally of said U-shaped member, and spring means on said bracket support for retaining said loop in position.

5. In a cinema projector according to claim 4, said loop being a piece of stiff wire having an integral part projecting at right angles as handle portion.

References Cited in the file of this patent

UNITED STATES PATENTS

| | | |
|---|---|---|
| 1,735,155 | Capstaff | Nov. 12, 1929 |
| 1,844,561 | Clapp | Feb. 9, 1932 |
| 1,906,931 | Lowkrantz | May 2, 1933 |
| 2,036,894 | Sweet et al. | Apr. 7, 1936 |
| 2,192,641 | Griffin et al. | Mar. 5, 1940 |

FOREIGN PATENTS

| | | |
|---|---|---|
| 499,629 | Great Britain | Jan. 26, 1939 |